US011062246B2

(12) United States Patent
Patel et al.

(10) Patent No.: US 11,062,246 B2
(45) Date of Patent: Jul. 13, 2021

(54) ENTERPRISE FRAMEWORK FOR EFFICIENT AND ADAPTABLE WORKFLOW APPLICATION DATA DISTRIBUTION

(71) Applicant: Bank of America Corporation, Charlotte, NC (US)

(72) Inventors: Rinken Patel, Newark, DE (US); Mahesh K. Krishnaswamy, Allen, TX (US); Chaudhri Nadeem Hassan, Plano, TX (US); Ravindra Gudimella, Frisco, TX (US); Giri Babu Sripati, Frisco, TX (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 484 days.

(21) Appl. No.: 15/954,228

(22) Filed: Apr. 16, 2018

(65) Prior Publication Data

US 2019/0318282 A1    Oct. 17, 2019

(51) Int. Cl.
*G06Q 10/06*      (2012.01)
*G06F 8/65*      (2018.01)

(52) U.S. Cl.
CPC .......... *G06Q 10/0633* (2013.01); *G06F 8/65* (2013.01)

(58) Field of Classification Search
CPC ............................. G06Q 10/0633; G06F 8/65
USPC ....................................................... 705/7.27
See application file for complete search history.

(56) References Cited

U.S. PATENT DOCUMENTS

| | | |
|---|---|---|
| 5,006,978 A | 4/1991 | Neches |
| 5,537,590 A | 7/1996 | Amado |
| 5,611,076 A | 3/1997 | Durflinger et al. |
| 5,664,206 A | 9/1997 | Murow et al. |
| 5,678,039 A | 10/1997 | Hinks et al. |
| 5,765,140 A | 6/1998 | Knudson et al. |
| 5,890,133 A | 3/1999 | Ernst |
| 6,237,020 B1 | 5/2001 | Leymann et al. |

(Continued)

OTHER PUBLICATIONS

Pegasystems soars into CRM. Bruno, Maria. Bank Technology News 12.12: 61,67+. SourceMedia. (Dec. 1999).*

(Continued)

*Primary Examiner* — Timothy Padot
(74) *Attorney, Agent, or Firm* — Michael A. Springs; Moore & Van Allen PLLC; Nicholas C. Russell

(57) ABSTRACT

A system and methods for an enterprise framework for efficient and adaptable workflow application data distribution using a Software Deployment Management (SDM) environment are described. Workflow data is received by the system from a workflow management application and modeled for downstream use. Use of a consumer data provisioning point (CDPP) agent includes utilization of a central control table that assists with the extraction, transformation and loading of workflow data from a proprietary format to a modeled relational forma. An end to end (E2E) automation process is controlled by the CDPP agent which facilitates extraction of data from upstream applications with configurable frequency for the transformed data. Embodiments of the invention provide efficiency improvements by automating numerous steps and eliminating the need for human input for various steps in the process of workflow data distribution and enable near-real-time data distribution and analytics.

17 Claims, 5 Drawing Sheets

(56) References Cited

U.S. PATENT DOCUMENTS

| | | | |
|---|---|---|---|
| 6,308,163 B1 | 10/2001 | Du et al. | |
| 6,349,238 B1* | 2/2002 | Gabbita | G06Q 10/10 |
| | | | 700/100 |
| 6,430,538 B1 | 8/2002 | Bacon et al. | |
| 6,606,740 B1 | 8/2003 | Lynn et al. | |
| 7,027,997 B1* | 4/2006 | Robinson | G06Q 10/06311 |
| | | | 705/7.26 |
| 7,207,041 B2 | 4/2007 | Elson et al. | |
| 7,760,737 B2 | 7/2010 | Rana et al. | |
| 2006/0074714 A1 | 4/2006 | Aziz et al. | |
| 2006/0074730 A1 | 4/2006 | Shukla et al. | |
| 2006/0074732 A1 | 4/2006 | Shukla et al. | |
| 2006/0074737 A1 | 4/2006 | Shukla et al. | |
| 2006/0173724 A1 | 8/2006 | Trefler et al. | |
| 2006/0200797 A1 | 9/2006 | Grasselt et al. | |
| 2009/0240531 A1* | 9/2009 | Hilborn | G06Q 10/10 |
| | | | 705/4 |
| 2009/0287628 A1 | 11/2009 | Indeck et al. | |
| 2010/0070463 A1* | 3/2010 | Zhao | G06Q 10/06 |
| | | | 707/608 |
| 2015/0153971 A1* | 6/2015 | Aoki | G06F 3/1206 |
| | | | 358/1.15 |
| 2015/0356495 A1* | 12/2015 | Virdi | G06Q 10/063114 |
| | | | 705/7.15 |
| 2016/0371622 A1* | 12/2016 | Kurian | G06Q 10/06316 |

OTHER PUBLICATIONS

Dragos A. Manolescu. Workflow enactment with continuation and future objects, in Proceedings of the ACM Conference on Object-Oriented Programming, Systems, Languages, and Applications (OOPSLA), pp. 40-51, Seattle, Washington, USA, 2002.*

Manolescu, D. A. and Johnson, R. E., Dynamic Object Model and Adaptive Workflow, OOPSLA Workshop on Metadata and Active Object Models, 1999.*

* cited by examiner

ENTERPRISE FRAMEWORK FOR EFFICIENT AND ADAPTABLE WORKFLOW APPLICATION DATA DISTRIBUTION

FIELD

The present invention relates to an enterprise framework for efficient software deployment.

BACKGROUND

Today there are many steps application developers must complete to transform data from proprietary workflow management output format to a relational format for downstream applications, systems, and consumers. There is a need for developing and deploying a framework for improving the process.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the present invention address the above needs and/or achieve other advantages by providing apparatuses (e.g., a system, computer program product and/or other devices) and methods for executing an enterprise framework for efficient and adaptable workflow application data distribution using a Software Deployment Management (SDM) environment. The system embodiments may comprise one or more memory devices having computer readable program code stored thereon, a communication device, and one or more processing devices operatively coupled to the one or more memory devices.

In some embodiments, the system for executing an enterprise framework for efficient and adaptable workflow application data distribution using a Software Deployment Management (SDM) environment, comprises one or more memory devices, one or more processing devices operatively coupled with the one or more memory devices comprising instructions executable by the one or more processing devices to transmit instruction to a proprietary workflow management application requesting workflow data tables, receive the workflow data tables comprising workflow data, each workflow data table having a plurality of corresponding parameters from a plurality of workflow applications, determine the corresponding parameters for each of the workflow data tables, stage the workflow data in a process batch for relational modeling, based on the determined parameters, extract workflow data from the proprietary workflow data tables, model the workflow data in a relational format for downstream consumption; and transmit the relational format data in standardized data tables to a plurality of downstream platforms.

In some embodiments, workflow data is modeled in a relational format for downstream consumption by determining a standardized relational format for storing relational data tables, based on the standardized relational format, generating one or more model conversion tables configured for transforming workflow data into the standardized relational format transforming the workflow data by applying the one or more model conversion tables, thereby resulting in relational format data, and populating a plurality of data tables with the relational format data, thereby resulting in the standardized data tables.

In some embodiments, the proprietary workflow management application is an SDM environment.

In some embodiments, the workflow data tables are formatted in extensible markup language.

In some embodiments, the workflow data tables are received from an SDM environment Business Intelligence Exchange process.

In some embodiments, modeling the workflow data in a relational format for downstream consumption and transmitting the relational format data to a plurality of downstream platforms occurs in near-real-time.

In some embodiments, the system stores historical data lineage information about the workflow data and relational format data that includes origin of the data and how it is transformed by the system.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
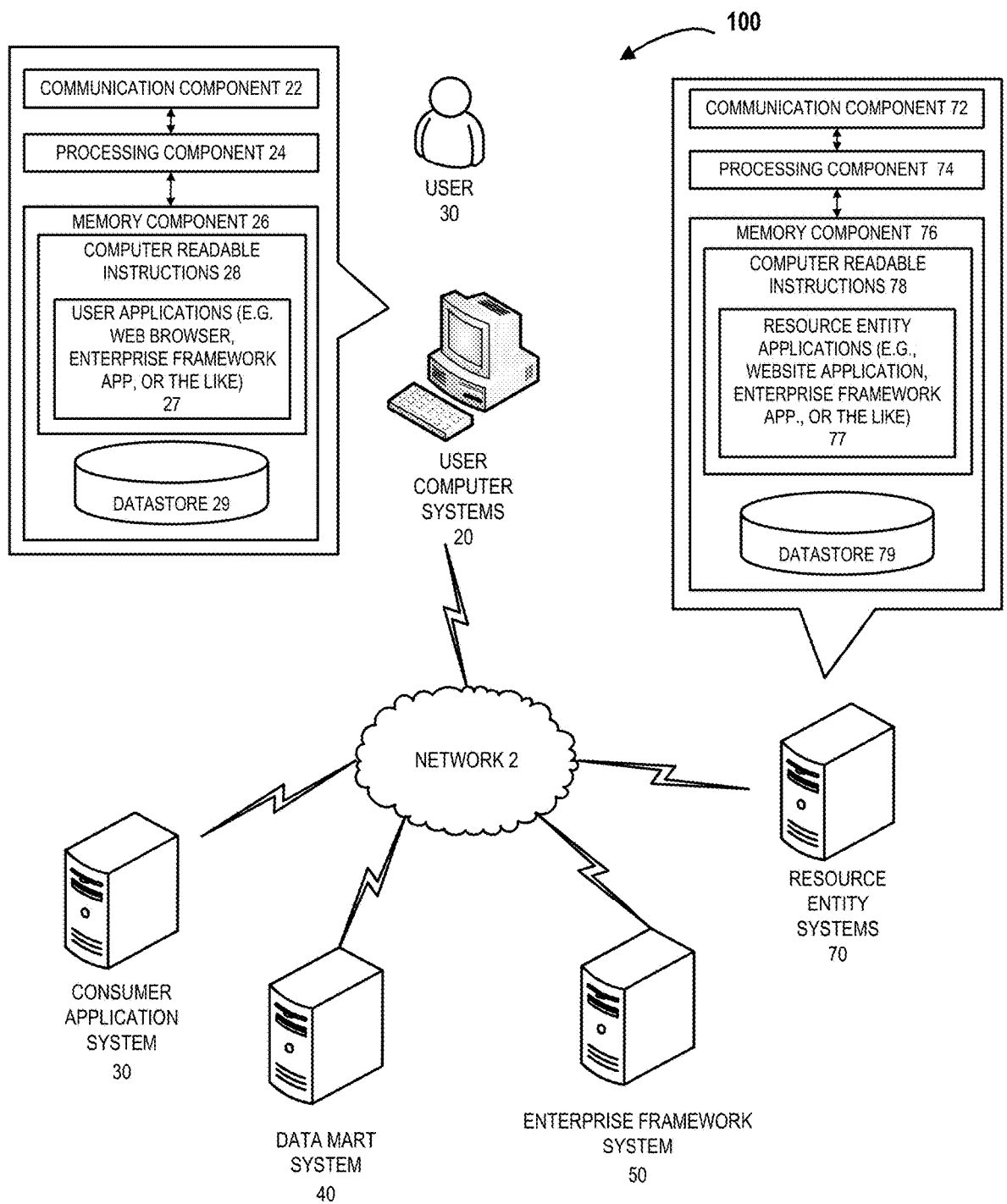

Having thus described embodiments of the invention in general terms, reference will now be made to the accompanying drawings, where:

FIG. 1 illustrates a system and environment 100 for executing an enterprise framework for efficient and adaptable workflow application data distribution, in accordance with embodiments of the invention.

Figure 2A:
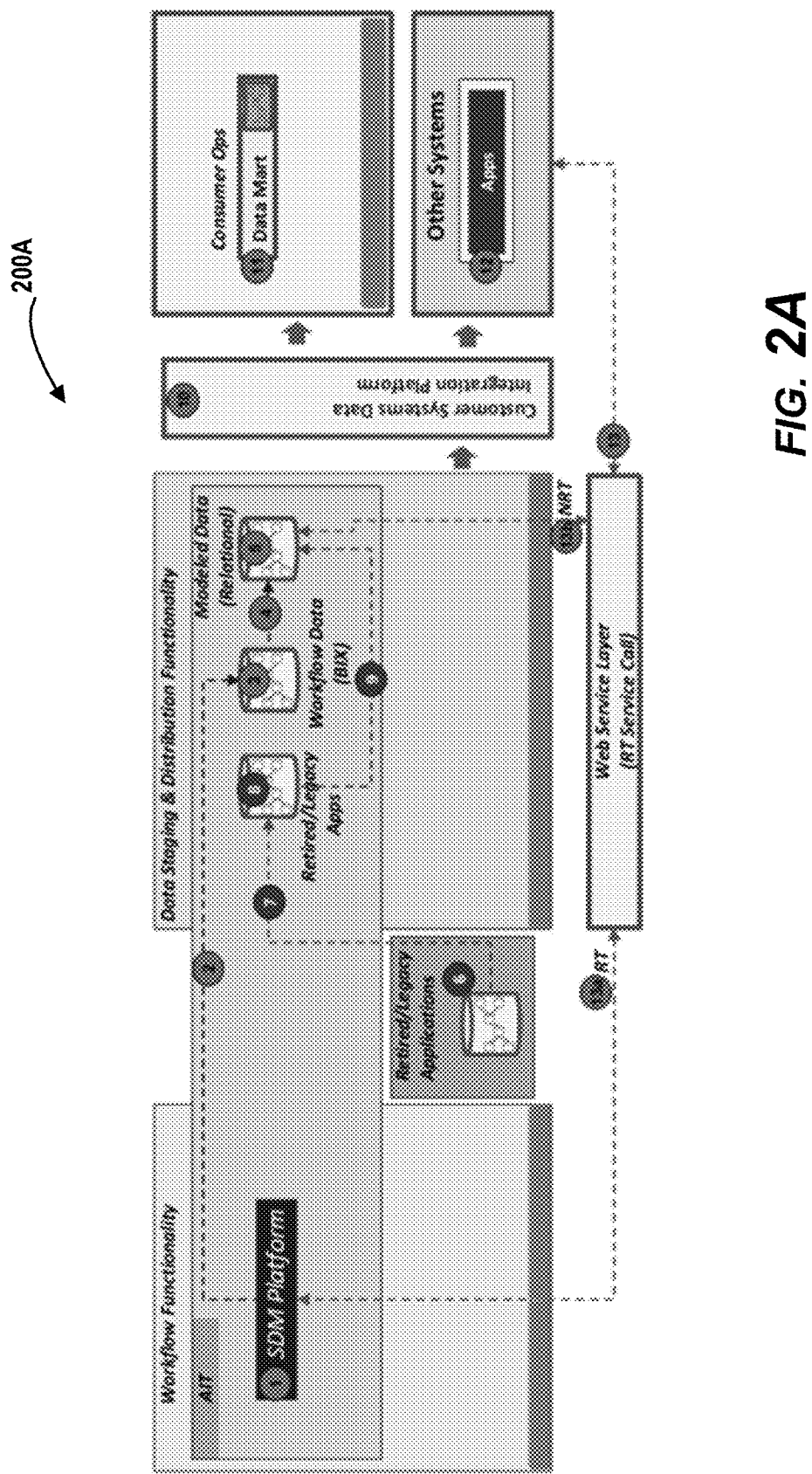
Figure 2B:
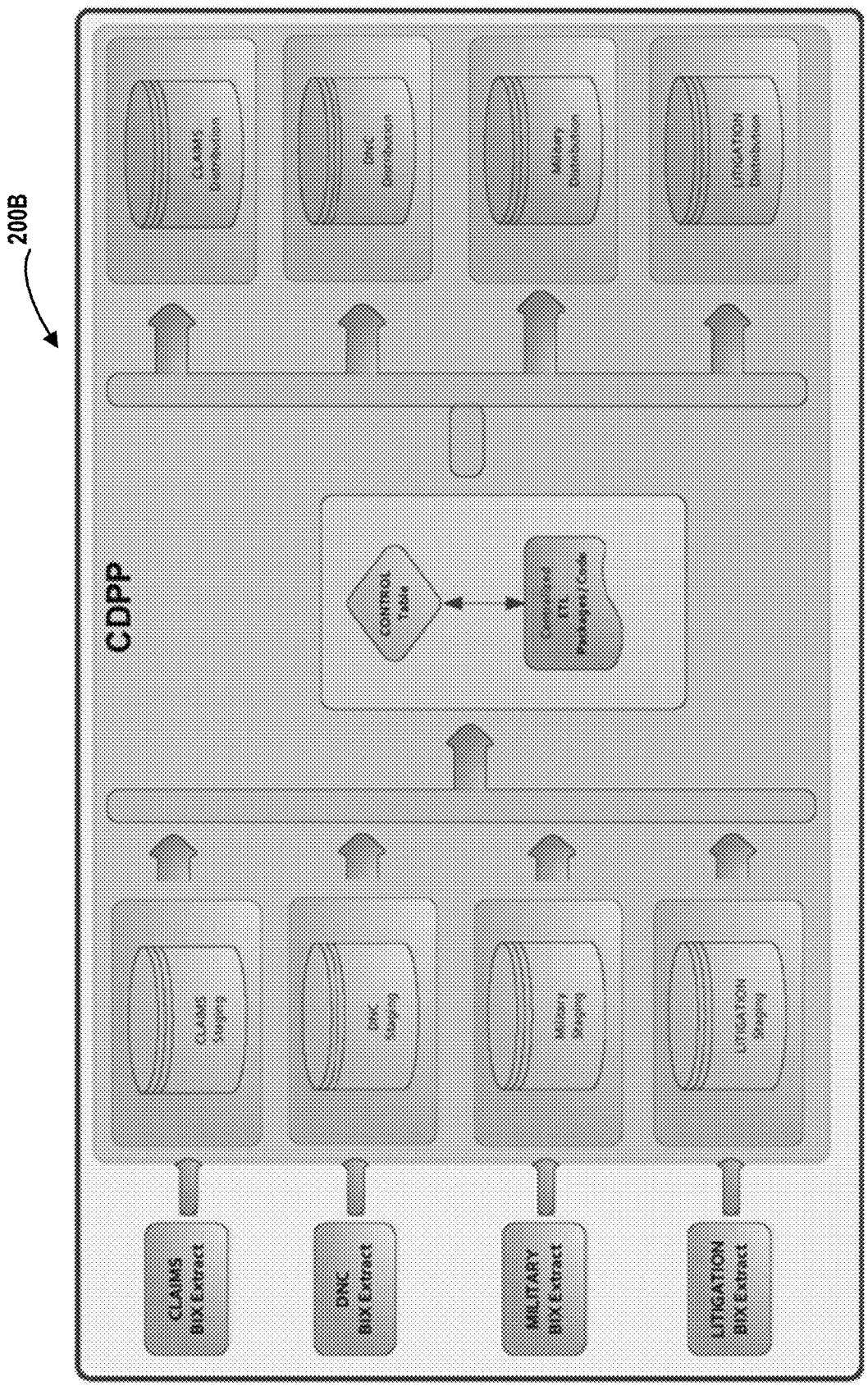

FIGS. 2A and 2B illustrate combined block diagram and process flows 200A and 200B, respectively, for adaptable workflow application data distribution according to embodiments of the invention.

Figure 3A:
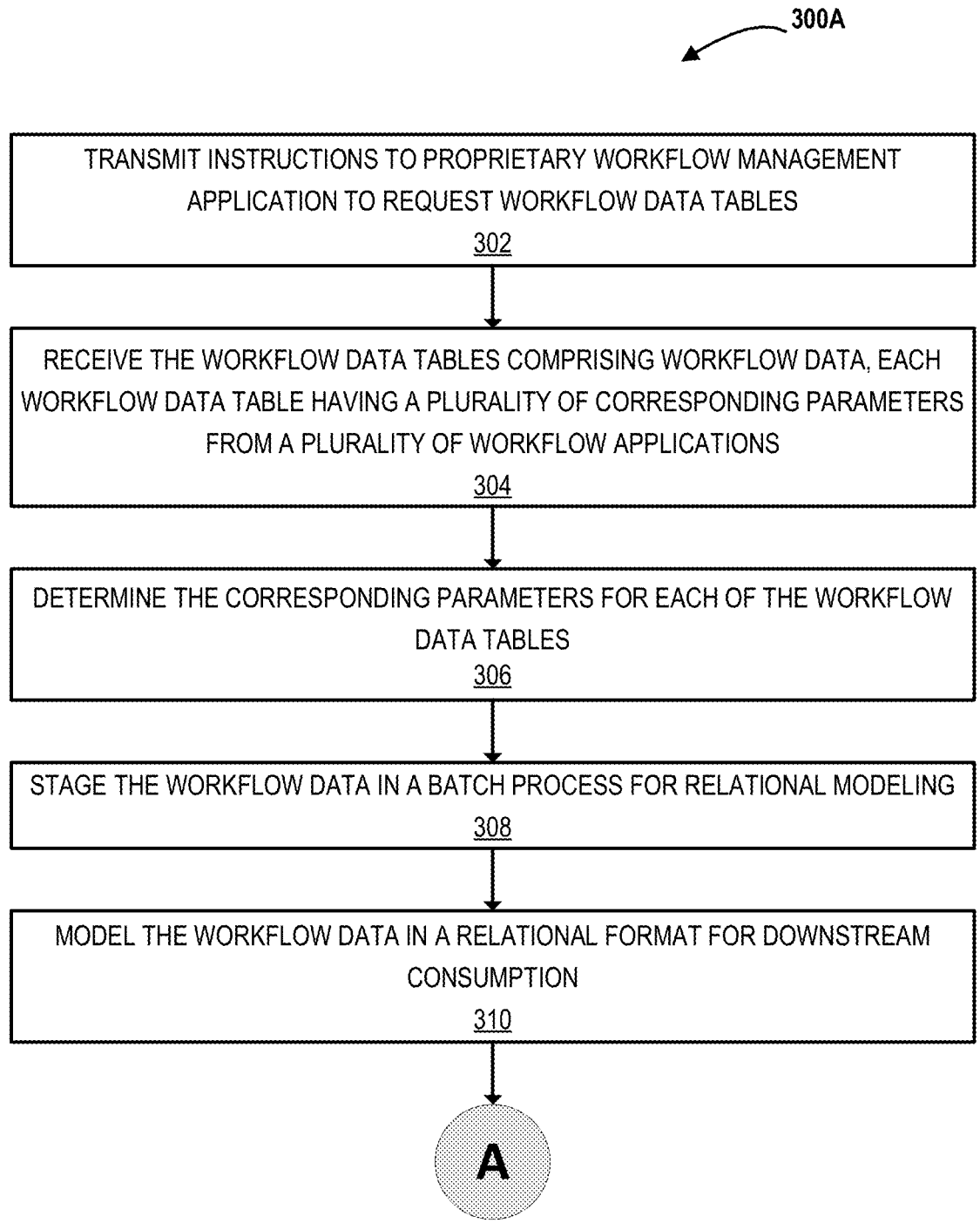
Figure 3B:
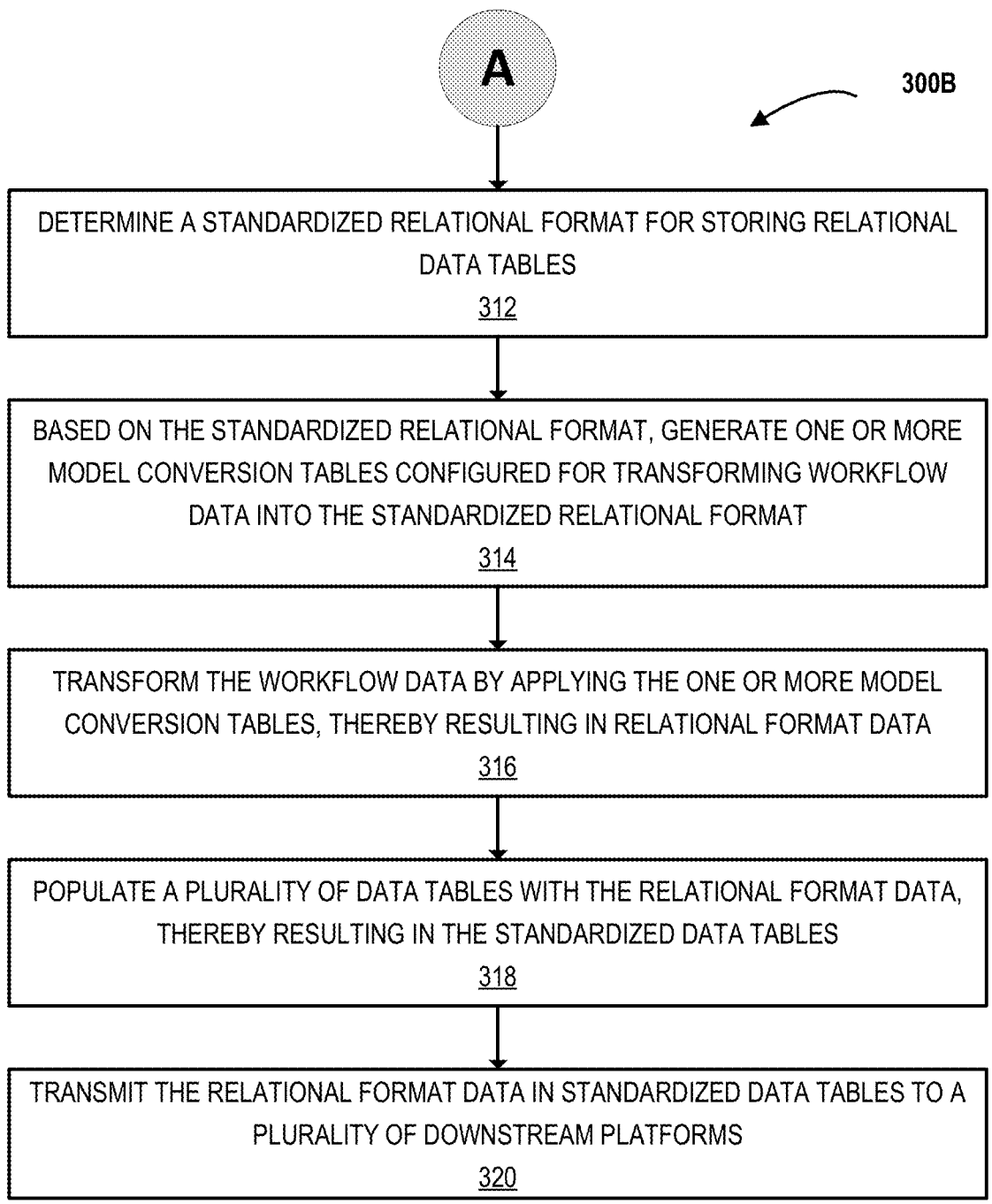

FIGS. 3A and 3B illustrate, a general process flow 300A and 300B, respectively, for executing an enterprise framework for efficient and adaptable workflow application data distribution according to embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Today there are many steps application developers must complete to deploy certain software within an entity. There is a need for developing and deploying a framework for improving the process, such as by automating and simplifying the process. The present invention provides for an adaptive, cloud-architected software that empowers people to rapidly deploy, and easily extend and change applications to meet strategic business needs, providing capabilities in content and resource management and business process management (BPM). This software functions to automate the workflow of tasks, building and delivering software. An SDM environment provides a tool called Business Intelligence Exchange (BIX) consisting of a ruleset and a stand-alone program that can be used to extract workflow data from a database into formats suitable for export. By standard, the SDM environment system stores workflow data as Binary Large Object (BLOB) data, which is a collection of binary data stored as a single entity in a database management system. Database support for BLOB data is not universal, and in some cases may result in large amorphous chunks of data. The SDM environment BIX tool extracts data into an Extensible Markup language (XML) format that defines a set of rules for encoding documents in a format that is both human readable and machine readable. BIX workflow extract data distribution currently has known reconciliation challenges such as missing data and data mismatch. In addition, BIX workflow extract data is staged and modeled by each downstream consuming application, which is not in compliance with Enterprise Data Management Plan (EDMP) standards. As such, BIX extracts will become out of sync over time due to application changes and updates (e.g., the addition or revision of functionality/features) if not continually updated and modified over time.

In the current state of the art, there is no standard common framework (i.e., distribution point) to provision data from certain SDM environment workflows to downstream applications and consumers. Applications either consume data directly from Workflow an SDM environment workflow in real time or data is shipped via BIX in a batch process to consumers and downstream applications. No data portal exists that can provide insight to reports, governance, data lineage, metadata, and other features for consumers and downstream applications with regard to workflow data from an SDM environment system. Currently, line of business users depend heavily on telecommunications solutions offered by companies focused specifically on supporting enterprise workloads and information technology cloud services, such as Breakthrough Technology Group (BTG), to provide these functions to downstream applications and consumers. Additionally, data extraction steps of current systems from SDM environments to downstream applications involve multiple data hops that lead to data duplication which violates enterprise data management plan principles.

Embodiments of the present invention provide for a workflow data distribution pattern that extracts data from vendor tables such as from BIX Engine into relational format for downstream consumption. The invention uses an end to end (E2E) automation process controlled by a Consumer Data Provisioning Point (CDPP) automation agent, which facilitates extraction of data from upstream SDM environment applications with configurable frequency for the transformed data. Embodiments of the invention provide efficiency improvements over traditional software deployment processes by automating numerous steps and eliminating the need for human input for various steps in the process of workflow data distribution.

In summary, embodiments of the invention provide a system for executing an enterprise framework for efficient and adaptable workflow application data distribution using a Software Deployment Management (SDM) environment. The system typically includes receiving workflow data from a workflow management application in an XML format; and in response to receiving the workflow data, initiating a consumer data provisioning point (CDPP) automation agent for modeling the workflow data into a relational format for downstream use.

Referring now to FIG. 1, in accordance with embodiments of the invention, the terms "resource entity system" may include any organization that processes financial transactions including, but not limited to, banks, credit unions, savings and loan associations, card associations, settlement associations, investment companies, stock brokerages, management firms, insurance companies and the like. Furthermore, embodiments of the present invention use the term "user" or "customer." It will be appreciated by someone with ordinary skill in the art that the user or customer may be a customer of the financial institution or a potential customer of the financial institution or an employee of the financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, personal computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system environment", as used herein, may refer to any information technology platform of an enterprise (e.g., a national or multi-national corporation) and may include a multitude of servers, machines, mainframes, personal computers, network devices, front and back end systems, database system and/or the like. Furthermore, the acronym "ETL" stands for "Extract, Transform and Load," steps performed in data warehousing processes which are responsible for extracting data from a source system or format and exporting the data downstream or storing the data in a database or datastore.

FIG. 1 illustrates a system and environment 100 for executing an enterprise framework for efficient and adaptable workflow application data distribution, in accordance with embodiments of the invention. As illustrated in FIG. 1, one or more resource entity systems 70 are operatively coupled, via a network 2, to user computer systems 20, a consumer application system 30, a data mart system 40, an enterprise framework environment 50, one or more server systems (not shown), and/or one or more other systems (not illustrated). In this way, the user 30 (e.g., one or more associates, employees, agents, contractors, sub-contractors, third-party representatives, customers, or the like), through a user application 27 (e.g., web browser, enterprise framework application, or the like), may access resource entity applications 77 (e.g., website, enterprise framework application, or the like) of the resource entity systems 70 to submit one or more commands, requests, and the like associated with application development and workflow data storage to the resource entity systems 70. In some embodiments, the enterprise framework application or tool may be a part of an independent system or environment. In such an embodiment, the enterprise framework environment 50 may be maintained and operated by the resource entity systems 70. The enterprise framework environment may comprise one or more processing devices operatively coupled to the one or more memory devices and configured to execute computer readable code stored in the one or more memory devices.

In some embodiments, the consumer application system 30, the data mart system 40, and the enterprise framework system 50 may be a part of the resource entity systems 70. The consumer application system 30, the data mart system 40, and the enterprise framework system 50 may comprise one or more processing devices operatively coupled to the one or more memory devices and configured to execute computer readable code stored in the one or more memory devices. In some embodiments, the consumer application system 30, the data mart system 40, and the enterprise framework system 50 may be a part of single environment system, wherein the single environment system may be maintained by the resource entity systems 70.

The network 2 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the resource entity systems 70 generally comprise one or more communication components 72, one or more processing components 14, and one or more memory components 76. The one or more processing components 14 are operatively coupled to the one or more communication components 72 and the one or more memory components 76. As used herein, the term "processing component" generally includes circuitry used for implementing the communication and/or logic functions of a particular system. For example, a processing component 74 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 78 thereof, which may be stored in the one or more memory components 76.

The one or more processing components 14 use the one or more communication components 72 to communicate with the network 2 and other components on the network 2, such as, but not limited to, the components of the user computer systems 20, the interaction entity systems 30, third-party systems 40, or other systems. As such, the one or more communication components 72 generally comprise a wireless transceiver, modem, server, electrical connection, electrical circuit, or other component for communicating with other components on the network 2. The one or more communication components 72 may further include an interface that accepts one or more network interface cards, ports for connection of network components, Universal Serial Bus (USB) connectors and the like. In one embodiment of the present invention, the one or more processing components 14 automatically implement one or more automated counter measures to mitigate impact of the one or more exposures.

As further illustrated in FIG. 1, the resource entity systems 70 comprise computer-readable instructions 78 stored in the memory component 76, which in one embodiment includes the computer-readable instructions 78 of the resource entity application 77 (e.g., website application, enterprise framework application, or the like). In some embodiments, the one or more memory components 76 include one or more data stores 79 for storing data related to the resource entity systems 70, including, but not limited to, data created, accessed, and/or used by the resource entity application 77.

Users 30 may access the resource entity application 77, or other applications, through a user computer system 20. The user computer system 20 may be a desktop, mobile device (e.g., laptop, smartphone device, PDA, tablet, or other mobile device), or any other type of computer that generally comprises one or more communication components 22, one or more processing components 24, and one or more memory components 26.

The one or more processing components 24 are operatively coupled to the one or more communication components 22 and the one or more memory components 26. The one or more processing components 24 use the one or more communication components 22 to communicate with the network 2 and other components on the network 2, such as, but not limited to, the user computer systems 20, a plurality of user computer systems 30, and/or other systems. As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 30. In some embodiments of the present invention, the enterprise framework application in the user computer systems 20 and the plurality of user computer systems 30 may enable a software deployment interface to display information associated with the development, deployment, testing, or other portions of the end-to-end process of software deployment to the user and receive information associated with the process.

As illustrated in FIG. 1, the user computer systems 20 may have computer-readable instructions 28 stored in the one or more memory components 26, which in one embodiment includes the computer-readable instructions 28 for user applications 27, such as event prediction application (e.g., apps, applet, or the like), portions of enterprise framework application, a web browser or other apps that allow the user 30 to take various actions, including allowing the user 30 to access applications located on other systems, or the like. In some embodiments, the user 30 utilizes the user applications 27, through the user computer systems 20, to access the resource entity applications 77 to perform exposure analysis. Moreover, in some embodiments the user 30 may also utilize the user applications 27 to implement one or more corrective measures to mitigate the impact of one or more errors or problems with the end-to-end process. The plurality of user computer systems 30 associated with a plurality of user 5 may include similar structure as that of the user computer systems 20.

Referring now to FIGS. 2A and 2B, a combined block diagram and process flow 200A and 200B, respectively, are provided for efficient and adaptable workflow application data distribution.

As shown in FIG. 2A, the process flow of the efficient and adaptable workflow application data distribution begins at the SDM Platform. The SDM platform 1 hosts the workflow data extraction process defined by platform extraction and data service protocols. In some embodiments, the output format for exchanging data will be BIX XML data 2 as shown in FIG. 2A by the connection highlighted between SDM Platform 1 and workflow data 3. At this point in the system process, the workflow data 3 is staged using a bath mode so that the data can be modeled into relational format, as shown by process arrow 4. The data is then modeled into relational format data 5. In some embodiments, the relational format data is modeled into relational format using infrastructure cloud database management, resulting in a database containing relational format data 5.

It should be noted that other sources of data may be incorporated by the system at this stage. For instance, there may exist on the network some legacy applications that are scheduled to retire, or which have already been retired. Data from these applications may be moved to an SDM environment data staging and distribution stage or downstream applications and consumers on a one time or on demand/need-only basis whenever there is a need or demand for such data. As shown, legacy and retired applications 6 may provide legacy and retired application data 7 to the SDM environment staging and distribution environment and stored at retired/legacy application data store 8. Similar to how workflow data is staged and modeled from the SDM environment, the legacy and retired application data 7 may be modeled to the current data storage model. In some embodiments, this may be done using a cloud database infrastructure model to incorporate the modeled legacy and historic data with relational format data 5.

As shown, relational format data 5 may be exported from the data staging and distribution area and sent to downstream systems that have previously requested the data or otherwise are scheduled to receive such data. The customer systems data integration platform (CSDP) 10 moves the relational format data 5 to consumer operations data marts 11 and other systems and applications 12, which may include application consumers, enterprise systems, external systems, and data mart systems. In some embodiments the CSDP may be a comprehensive software package for real-time data integration and replication in heterogeneous environments.

Also shown in FIG. 2A is the web service layer 13 for real time service calls. Particular applications and downstream systems may need SDM environment workflow data directly from the SDM environment application. In this case, the particular application or other downstream system can request the data through the web service layer 13 and receive data from the SDM environment application in real time via pathway 12A. In other embodiments, the particular application or other downstream system may request relational format data 5 from the data staging and distribution platform. As shown by process pathway 12B, the web service layer 13 may provide data from the data staging and distribution platform in near-real-time to the particular application or other downstream system.

FIG. 2B illustrates a process flow 200B for adaptable workflow application data distribution in accordance with embodiments of the invention. As shown in FIG. 2B, the CDPP ETL process can simplify on-boarding for new applications as it acts as a translational tool for data coming from proprietary workflow management software. Data can be extracted from the workflow management software in a number of subgroups applicable to certain applications and uses, such as claims, military data, digital numerical control (DNC) data, litigation data and the like. One of ordinary skill in the art will appreciate that the list of downstream applications and use cases related to workflow data are numerous. As such, only a few specific embodiments are listed here, but the data types are not limited to these specific use cases shown.

By using the control table and centralized ETL code, the addition of new data tables to existing schema does not require ETL code changes. ETL coding remains centralized within the CDPP automation process for all business areas, so it remains simple to maintain as the distribution needs scale up or become more complex downstream. Minimum developer resources are required for the ETL process, and the code is light weight. In some embodiments, the ETL code is less than 500 lines, making it extremely easy to manage and update as compared to traditional ETL code for multiple downstream use cases. For this reason, enhancements across the overall CDPP enabled process have a relatively straightforward implementation as compared to traditional enterprise ETL data processes, and there is less turn around time for enhancements using CDPP automation.

Implementation of the centralized control tables enable onboarding of new applications without making code changes. That is, the code bases for the ETL processes remain the same regardless of which application is on boarded. In this way, the ETL process is implemented in a dynamic fashion by use of the centralized control table. The combination of ETL processes with the CDPP control tables allows the system to harness the power of the SDM environment system's centralized data management tools in a dynamic fashion that seamlessly interfaces with downstream applications. Additionally, the system is engineered such that if there is a change to the proprietary workflow management tool employed by the system, the front layer will endure only minor changes and the CDPP system will not incur a major shift in data handling. The view of the data from the downstream applications and end user standpoint will remain the same even if the system undergoes upstream product changes.

Referring now to FIGS. 3A and 3B, a general process flow 300A and 300B, respectively, are provided for efficient and adaptable workflow application data distribution. The first step, as represented by block 302, is to transmit instructions to the proprietary workflow management application to request workflow data tables. This step allows the system to request and receive workflow data from an SDM environment system for later modeling and downstream distribution. In some embodiments, the data is transmitted from the workflow management application in BIX format or XML format.

The next step, as represented by block 304, is for the system to receive the workflow data tables comprising workflow data. Each workflow data table contains a plurality of corresponding parameters from a plurality of workflow applications. These parameters may be managed and selected by user 30 from within the workflow management application based on the needs of downstream workflow applications. As illustrated in block 306, the next step for the workflow application data distribution system is to determine which parameters from the workflow data table correspond to those required by the plurality of workflow applications.

Next, the workflow data is staged in the data staging and distribution step of the CDPP workflow application data distribution system, as shown by block 308. In some embodiments, the user 30 may determine that data is to be staged in a batch process at a specified interval for data export downstream. In other embodiments, the workflow data may be staged only temporarily for modeling and immediate transmission downstream to applications that have requested real time or near-real-time data via the web service layer. As shown by block 310, the next step in the process is for the CDPP workflow application data distribution system to model the workflow data in a relational format for downstream consumption using the centralized control table and ETL packages/code.

FIG. 3B illustrates a continuation of the general flow process 300B for the workflow application data distribution system. As shown, the next step in the general flow process is shown at block 312, wherein the system determines a standardized relational format for storing relational data tables. This format may vary based on the embodiment of the invention and type of data introduced to the system from external workflow management applications. The standardized relational format is used to generate one or more model conversion tables configured for transforming workflow data, as shown by block 314. It is understood that the one or more model conversion tables configured for transforming workflow data may also be referred to as the "control table" in other areas of this specification. In some embodiments, the invention may contain one or more control tables designed to model workflow data and interface with the centralized ETL code.

As shown in block 316, the next step is for the system to transform the workflow data by applying the one or more model conversion tables, thereby resulting in relational format data. This data is used to populate a plurality of data tables with the relational format data, resulting in standardized data tables, shown in block 318. Finally, the system transmits the relational format data in standardized data tables to a plurality of downstream applications or platforms, as shown in block 320.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein. In some embodiments, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for executing an enterprise framework for efficient and adaptable workflow application data distribution using a Software Deployment Management (SDM) environment, the system comprising:
    one or more memory devices;
    one or more processing devices operatively coupled with the one or more memory devices comprising instructions executable by the one or more processing devices to:
    transmit instruction to a proprietary workflow management application requesting workflow data tables;
    receive the workflow data tables comprising workflow data, each workflow data table having a plurality of corresponding parameters from a plurality of workflow applications;
    determine the corresponding parameters for each of the workflow data tables;
    stage the workflow data in a process batch for relational modeling;
    based on the determined parameters, extract workflow data from the proprietary workflow data tables;
    model the workflow data in a relational format for downstream consumption, wherein modeling the workflow data in a relational format for downstream consumption further comprises:
        determining a standardized relational format for storing relational data tables;
        based on the standardized relational format, generating one or more model conversion tables configured for transforming workflow data into the standardized relational format, wherein the model conversion tables comprise a control table and lightweight centralized extract, transfer, load (ETL) code of 500 lines or less;
        transforming the workflow data by applying the one or more model conversion tables, thereby resulting in relational format data;
        populating a plurality of data tables with the relational format data, thereby resulting in the standardized data tables; and
    transmit the relational format data in standardized data tables to a plurality of downstream platforms.

2. The system of claim 1, wherein the proprietary workflow management application is an application which extracts data into an extensible markup language format that defines one or more sets of rules for encoding documents in a format that is both human readable and machine readable.

3. The system of claim 1, wherein the workflow data tables are formatted in extensible markup language.

4. The system of claim 1, wherein the workflow data tables are received from a business process management program.

5. The system of claim 1, wherein modeling the workflow data in a relational format for downstream consumption and transmitting the relational format data to a plurality of downstream platforms occurs in near-real-time.

6. The system of claim 1 further comprising:
    storing historical data lineage information about the workflow data and relational format data that includes origin of the data and how it is transformed by the system.

7. A computer program product for executing an enterprise framework for efficient and adaptable workflow application data distribution using a Software Deployment Management (SDM) environment, wherein the computer program product comprises at least one non-transitory computer readable medium comprising computer readable instructions, the instructions comprising:
    transmit instruction to a proprietary workflow management application requesting workflow data tables;
    receive the workflow data tables comprising workflow data, each workflow data table having a plurality of corresponding parameters from a plurality of workflow applications;
    determine the corresponding parameters for each of the workflow data tables;
    stage the workflow data in a process batch for relational modeling;
    based on the determined parameters, extract workflow data from the proprietary workflow data tables;

model the workflow data in a relational format for downstream consumption, wherein modeling the workflow data in a relational format for downstream consumption further comprises:
  determining a standardized relational format for storing relational data tables;
  based on the standardized relational format, generating one or more model conversion tables configured for transforming workflow data into the standardized relational format, wherein the model conversion tables comprise a control table and lightweight centralized extract, transfer, load (ETL) code of 500 lines or less;
  transforming the workflow data by applying the one or more model conversion tables, thereby resulting in relational format data;
  populating a plurality of data tables with the relational format data, thereby resulting in the standardized data tables; and
  transmit the relational format data in standardized data tables to a plurality of downstream platforms.

8. The computer program product of claim 7, wherein the proprietary workflow management application is an application which extracts data into an extensible markup language format that defines one or more sets of rules for encoding documents in a format that is both human readable and machine readable.

9. The computer program product of claim 7, wherein the workflow data tables are formatted in extensible markup language.

10. The computer program product of claim 7, wherein the workflow data tables are received from an application which extracts data into an extensible markup language format that defines one or more sets of rules for encoding documents in a format that is both human readable and machine readable.

11. The computer program product of claim 7, wherein modeling the workflow data in a relational format for downstream consumption and transmitting the relational format data to a plurality of downstream platforms occurs in near-real-time.

12. The computer program product of claim 7, further comprising:
  storing historical data lineage information about the workflow data and relational format data that includes origin of the data and how it is transformed by the system.

13. A computer implemented method for executing an enterprise framework for efficient and adaptable workflow application data distribution using a Software Deployment Management (SDM) environment, the computer implemented method comprising:
  transmitting instruction to a proprietary workflow management application requesting workflow data tables;
  receiving the workflow data tables comprising workflow data, each workflow data table having a plurality of corresponding parameters from a plurality of workflow applications;
  determining the corresponding parameters for each of the workflow data tables;
  staging the workflow data in a process batch for relational modeling;
  based on the determined parameters, extracting workflow data from the proprietary workflow data tables;
  modeling the workflow data in a relational format for downstream consumption, wherein modeling the workflow data in a relational format for downstream consumption further comprises:
    determining a standardized relational format for storing relational data tables;
    based on the standardized relational format, generating one or more model conversion tables configured for transforming workflow data into the standardized relational format, wherein the model conversion tables comprise a control table and lightweight centralized extract, transfer, load (ETL) code of 500 lines or less;
    transforming the workflow data by applying the one or more model conversion tables, thereby resulting in relational format data;
    populating a plurality of data tables with the relational format data, thereby resulting in the standardized data tables; and
    transmitting the relational format data in standardized data tables to a plurality of downstream platforms.

14. The computer implemented method of claim 13, wherein the proprietary workflow management application is an application which extracts data into an extensible markup language format that defines one or more sets of rules for encoding documents in a format that is both human readable and machine readable.

15. The computer implemented method of claim 13, wherein the workflow data tables are received from an application which extracts data into an extensible markup language format that defines one or more sets of rules for encoding documents in a format that is both human readable and machine readable.

16. The computer implemented method of claim 13, wherein modeling the workflow data in a relational format for downstream consumption and transmitting the relational format data to a plurality of downstream platforms occurs in near-real-time.

17. The computer implemented method of claim 13, further comprising:
  storing historical data lineage information about the workflow data and relational format data that includes origin of the data and how it is transformed by the system.

* * * * *